(12) United States Patent
Bharat et al.

(10) Patent No.: US 9,235,849 B2
(45) Date of Patent: Jan. 12, 2016

(54) GENERATING USER INFORMATION FOR USE IN TARGETED ADVERTISING

(75) Inventors: Krishna Bharat, Santa Clara, CA (US); Stephen Lawrence, Mountain View, CA (US); Mehran Sahami, Redwood City, CA (US)

(73) Assignee: Google Inc., Mountain View, CA (US)

( * ) Notice: Subject to any disclaimer, the term of this patent is extended or adjusted under 35 U.S.C. 154(b) by 651 days.

(21) Appl. No.: 10/750,363

(22) Filed: Dec. 31, 2003

(65) Prior Publication Data

US 2005/0131762 A1 Jun. 16, 2005

(51) Int. Cl.
  *G06Q 30/02* (2012.01)
  *G06Q 30/00* (2012.01)
  *G06Q 10/00* (2012.01)

(52) U.S. Cl.
  CPC ............ *G06Q 30/0251* (2013.01); *G06Q 10/00* (2013.01); *G06Q 30/02* (2013.01); *G06Q 30/0269* (2013.01)

(58) Field of Classification Search
  CPC ................................................ G06Q 30/0251
  USPC .................. 705/14, 1, 3, 52, 14.49; 455/3.04; 709/224
  See application file for complete search history.

(56) References Cited

U.S. PATENT DOCUMENTS

| 5,724,521 A | 3/1998 | Dedrick | |
|---|---|---|---|
| 5,724,567 A * | 3/1998 | Rose et al. | 707/2 |

(Continued)

FOREIGN PATENT DOCUMENTS

| JP | 11-282875 | 10/1999 |
|---|---|---|
| JP | 2000-132559 | 5/2000 |

(Continued)

OTHER PUBLICATIONS

PCT/ISA/220, "Notification of Transmittal of the International Search Report and the Written Opinion of the International Searching Authority, or the Declaration" for PCT/US04/42912, mailed Jul. 22, 2005 (1 pg.).

(Continued)

*Primary Examiner* — Calvin L Hewitt, II
*Assistant Examiner* — Cristina Sherr
(74) *Attorney, Agent, or Firm* — Fish & Richardson P.C.

(57) ABSTRACT

User profile information for a user may be determined by (a) determining initial user profile information for the user, (b) inferring user profile information for the user, and (c) determining the user profile information for the user using both the initial user profile information and the inferred user profile information. Initial user profile information for the user may be determined using past search queries submitted by the user, and/or past document selections by the user. User profile information for the user may be inferred by (a) defining a node for each of a number of documents and the user, (b) adding edges between nodes if there is an association between the nodes to define a graph, and (c) inferring user profile information for the user using a topology of the graph and user profile information of other documents. Similarly, user profile information for a document may be determined by (a) determining initial user profile information for the document, (b) inferring user profile information for the document, and (c) determining the user profile information for the document using both the initial user profile information and the inferred user profile information. The initial user profile information for the document may be determined using content information from the document, and/or document meta information. User profile information for the document may be inferred by (a) defining a node for each of a number of documents and for each of a number of users, (b) adding edges between nodes if there is an association between the nodes to define a graph, and (c) inferring user profile information for the document using a topology of the graph and user profile information of users and of other documents. Document, user, and/or ad user profile information may be used when serving ads.

20 Claims, 7 Drawing Sheets

(56) References Cited

U.S. PATENT DOCUMENTS

| | | | |
|---|---|---|---|
| 5,740,549 A | | 4/1998 | Reilly et al. |
| 5,754,939 A | * | 5/1998 | Herz et al. ............... 455/3.04 |
| 5,848,397 A | | 12/1998 | Marsh et al. |
| 5,933,827 A | * | 8/1999 | Cole et al. ............... 707/10 |
| 5,948,061 A | | 9/1999 | Merriman |
| 5,953,718 A | | 9/1999 | Wical |
| 5,999,975 A | * | 12/1999 | Kittaka et al. ............. 709/224 |
| 6,006,218 A | * | 12/1999 | Breese et al. ............... 707/3 |
| 6,012,051 A | * | 1/2000 | Sammon et al. ............. 706/52 |
| 6,026,368 A | | 2/2000 | Brown et al. |
| 6,044,376 A | | 3/2000 | Kurtzman, II |
| 6,078,914 A | | 6/2000 | Redfern |
| 6,134,532 A | * | 10/2000 | Lazarus et al. ............. 705/14 |
| 6,144,944 A | * | 11/2000 | Kurtzman et al. ............. 705/14 |
| 6,167,382 A | | 12/2000 | Sparks et al. |
| 6,182,050 B1 | * | 1/2001 | Ballard ............... 705/14 |
| 6,269,361 B1 | | 7/2001 | Davis et al. |
| 6,285,999 B1 | | 9/2001 | Page et al. |
| 6,366,956 B1 | * | 4/2002 | Krishnan ............... 709/223 |
| 6,401,075 B1 | | 6/2002 | Mason et al. |
| 6,493,702 B1 | * | 12/2002 | Adar et al. ............... 707/3 |
| 6,711,585 B1 | * | 3/2004 | Copperman et al. ........ 707/104.1 |
| 6,721,713 B1 | * | 4/2004 | Guheen et al. ............... 705/1 |
| 6,981,040 B1 | * | 12/2005 | Konig et al. ............. 709/224 |
| 6,985,882 B1 | | 1/2006 | Del Sesto |
| 7,031,961 B2 | * | 4/2006 | Pitkow et al. ............... 707/4 |
| 7,039,599 B2 | | 5/2006 | Merriman |
| 7,136,875 B2 | | 11/2006 | Anderson et al. |
| 8,352,499 B2 | | 1/2013 | Bharat et al. |
| 2002/0049635 A1 | * | 4/2002 | Mai et al. ............... 705/14 |
| 2002/0082901 A1 | * | 6/2002 | Dunning et al. ............. 705/10 |
| 2003/0101024 A1 | * | 5/2003 | Adar et al. ............... 702/187 |
| 2004/0059712 A1 | | 3/2004 | Dean et al. |
| 2004/0267725 A1 | * | 12/2004 | Harik ............... 707/3 |
| 2005/0080772 A1 | * | 4/2005 | Bem ............... 707/3 |
| 2012/0095837 A1 | | 4/2012 | Bharat et al. |

FOREIGN PATENT DOCUMENTS

| | | |
|---|---|---|
| JP | 2000-339322 | 12/2000 |
| JP | 2001-229167 | 8/2001 |
| JP | 2002-520689 | 7/2002 |
| JP | 2002-368822 | 12/2002 |
| JP | 2003-524236 | 8/2003 |
| KR | 2001-76023 | 8/2001 |
| WO | WO 97/21183 | 6/1997 |
| WO | WO 00/02112 | 1/2000 |
| WO | WO 01/46876 | 6/2001 |
| WO | WO03/017137 | 2/2003 |

OTHER PUBLICATIONS

PCT/ISA/210, "International Search Report" for PCT/US04/42912, mailed Jul. 22, 2005 (3 pgs.).
Form PCT/ISA/237, "Written Opinion of the International Searching Authority" for PCT/US2004/042912, mailed Jul. 22, 2005 (5 pgs.).
Form PCT/IB/326, "Notification Concerning Transmittal of International Preliminary Report on Patentability (Chapter I of the Patent Cooperation Treaty)" for PCT/US2004/042912, mailed Jul. 13, 2006 (1 pg.).
Form PCT/IB/373, "International Preliminary Report on Patentability" for PCT/US2004/042912, issued Jul. 3, 2006 (1 pg.).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, $2^{nd}$ Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Statement Regarding References in 1449 Form.
Notice for Preliminary Rejection for Korean Patent Application No. 10-2008-7026699, mailed Jan. 23, 2008 (6 pgs.) with translation (7 pgs.).
Notice of Reasons for Rejection for Japanese Patent Application No. 2006-547257, mailed Jan. 6, 2009 (10 pgs.) with translation (11 pgs.).
Examiner's Report No. 2 for Australian Patent Application No. 2004311786 dated Jun. 11, 2009 (3 pgs.).
Langheinrich, et al., "Unintrusive Customization Techniques for Web Advertising," *Computer Networks* (1999) (18 pgs.).
Australian Government/IP Australia, Tim Yang, Examiner's First Report, Application No. 2009222546, mailed on Jan. 14, 2011 (2 pages).
Canadian Intellectual Property Office, Nenad Jevtic, Examination Report, Application No. 2,552,181, mailed on Oct. 27, 2011 (2 pages).
Canadian Intellectual Property Office, Nenad Jevtic, Examination Report, Application No. 2,552,181, mailed on Feb. 11, 2013 (5 pages).
European Patent Office, Evelyn Mülthaler, Communication pursuant to Article 94(3) EPC, Application No. 04 815 035.3-2221, mailed on Nov. 20, 2009 (3 pages).
Government of India Patent Office, Kasthuri Mohan, First Examination Report, Application No. 2812/CHENP/2006, mailed on Jan. 5, 2009 (2 pages).
Japan Patent Office, Mitsuyo Aoyanagi, Decision of Rejection (including English Translation), Application No. 2006-547257, mailed on Sep. 29, 2009 (4 pages).
Japan Patent Office, Tadashi Inoue, Official Letter of Inquiry (including English Translation), Appeal No. 2010-2050, Application No. 2006,547257, mailed on Jun. 28, 2011 (8 pages).
Japan Patent Office, Seiji Teshima, First Office Action (including English Translation), Appeal No. 2010-2050, Application No. 2006-547257, mailed on Jan. 31, 2012 (4 pages).
Japan Patent Office, Seiji Tejima, Second Office Action (including English Translation), Appeal No. 2010-2050, Application No. 2006-547257, mailed on Nov. 6, 2012 (4 pages).
Japan Patent Office, Mitsuyo Aoyagi, English Translation of First Office Action, Application No. 2010-018774, mailed on Jun. 5, 2012 (4 pages).
Japan Patent Office, Mitsuyo Aoyagi, Decision of Rejection (including English Translation), Application No. 2010-018774, mailed on Apr. 9, 2013 (4 pages).
Brin and Page, "The Anatomy of a Large-Scale Hypertextual Search Engine," Seventh International World Wide Web Conference, Brisbane, Australia—Apr. 14-18, 1998.

(56) References Cited

OTHER PUBLICATIONS

Salton, G. et al., "Term-Weighting Approaches in Automatic Text Retrieval", Information Processing and Management, vol. 24(5):513-523 (1988).
Salton, G. et al., "A Vector Space Model for Automatic Indexing", Communication of the ACM, vol. 18(11): 613-620 (1975).
Office Action in Canadian Application No. 2,552,181, mailed May 5, 2014, 4 pages.
Office Action issued in European Application No. 04815035.3 on Jun. 5, 2015, 9 pages.
Office Action issued in Canadian Application No. 2,552,181 on May 27, 2015, 6 pages.

* cited by examiner

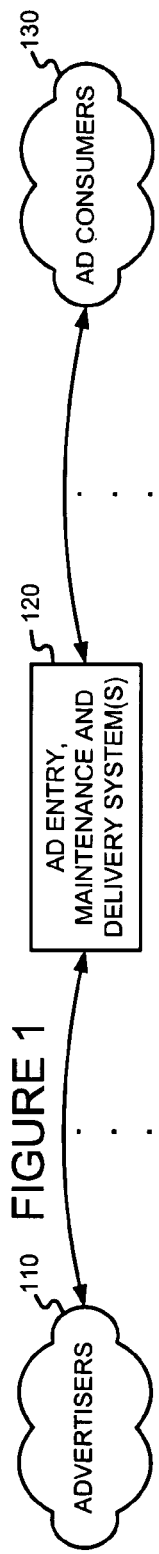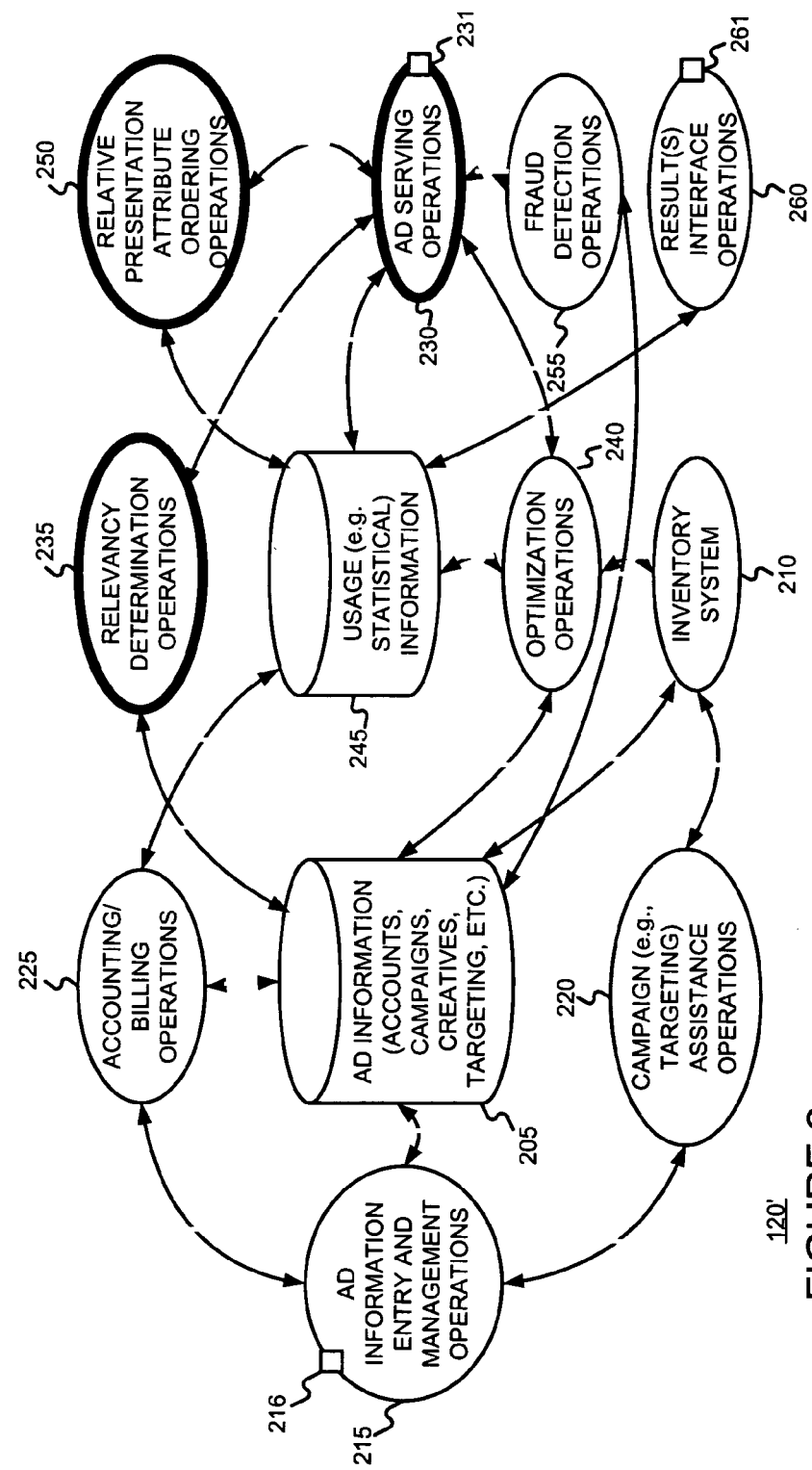

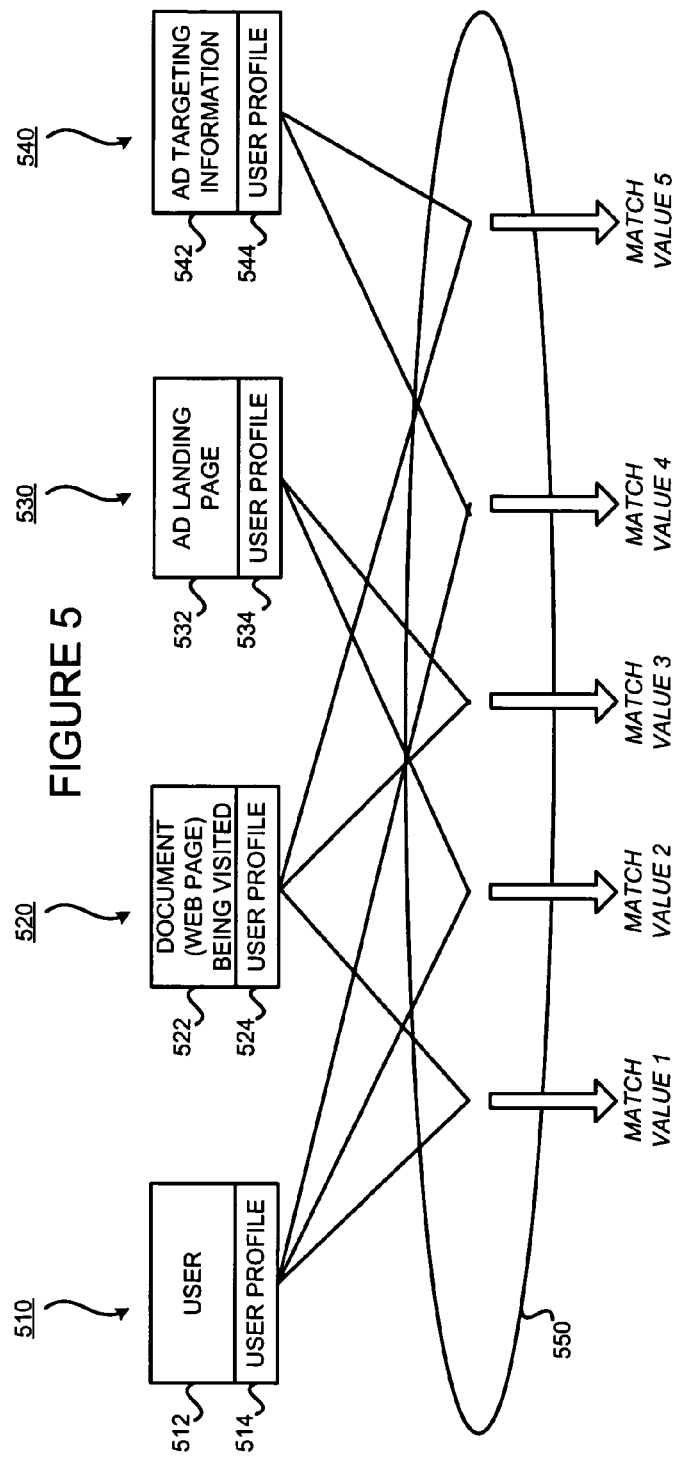

GENERATING USER INFORMATION FOR USE IN TARGETED ADVERTISING

§1. BACKGROUND OF THE INVENTION

§1.1 Field of the Invention

The present invention concerns advertising. In particular, the present invention concerns determining particularly relevant advertisements or advertisement creatives to serve for a user request, such as a search query or document request for example.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are typically presented to their advertising audience in the form of "banner ads"—i.e., a rectangular box that includes graphic components. When a member of the advertising audience (referred to as a "viewer" or "user" in the specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is rendered) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment.

Similarly, the hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com", which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered with a search results page and so that they will be relevant, presumably, to the query that prompted the search results page. Other targeted advertising systems, such as those that target ads based on e-mail information (See, e.g., the systems described in U.S. patent application Ser. No. 10/452,830 (incorporated herein by reference), titled "SERVING ADVERTISEMENTS USING INFORMATION ASSOCIATED WITH E-MAIL", filed on Jun. 2, 2003 and listing Jeffrey A. Dean, Georges R. Harik and Paul Bucheit as inventors.); or those that target ads based on content (See, e.g., U.S. patent application Ser. No. 10/375,900 (incorporated herein by reference), titled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors.) may have similar challenges. That is, advertising systems would like to present advertisements that are relevant to the user requested information in general, and related to the current user interest in particular.

As can be appreciated from the foregoing, targeted advertising systems, such as keyword-targeted advertising or content-targeted advertising provide very useful forms of advertising. However, even online advertising systems that can serve generally relevant advertisements often cannot select relevant advertisements best suited for a particular user.

Accordingly, there is a need to improve the performance of online advertising. More specifically, there is a need to increase the relevancy of ads served for some user request, such as a search query or a document request for example, to the user that submitted the request.

§2. SUMMARY OF THE INVENTION

The present invention describes methods and apparatus for determining a match used for scoring an ad. Such methods and apparatus may (a) determine a first match value using (i) user profile information of an ad landing page of the ad and/or user profile information used for targeting the ad, and (ii) user profile information of a user to which the ad will be rendered, (b) determining a second match value using (i) user profile information of an ad landing page of the ad and/or user profile information used for targeting the ad, and (ii) user profile information of a document with which the ad will be served, and (c) determining the match used for scoring the ad using the first match value and the second match value.

The present invention also teaches that in methods and apparatus such as the foregoing, or in other methods and apparatus for targeting ads using user profile information, at least some of the user profile information of the ad landing page of the ad, at least some of the user profile information used for targeting of the ad, at least some of the user profile information of the user, and/or at least some of the user profile information of the document may be inferred.

In one embodiment of the present invention, user profile information for a user may be determined by (a) determining initial user profile information for the user, (b) inferring user profile information for the user, and (c) determining the user profile information for the user using both the initial user profile information and the inferred user profile information. Initial user profile information for the user may be determined using past search queries submitted by the user, and/or past document selections by the user.

In one embodiment of the present invention, user profile information for the user may be inferred by (a) defining a node for each of a number of documents and the user, (b) adding edges between nodes if there is an association between the nodes to define a graph, and (c) inferring user profile information for the user using a topology of the graph and user profile information of other documents.

In one embodiment of the present invention, user profile information for a document may be determined by (a) determining initial user profile information for the document, (b) inferring user profile information for the document, and (c) determining the user profile information for the document using both the initial user profile information and the inferred user profile information. The initial user profile information for the document may be determined using content information from the document, and/or document meta information.

In one embodiment of the present invention, user profile information for the document may be inferred by (a) defining a node for each of a number of documents and for each of a number of users, (b) adding edges between nodes if there is an association between the nodes to define a graph, and (c) inferring user profile information for the document using a topology of the graph and user profile information of users and of other documents.

§3. BRIEF DESCRIPTION OF THE DRAWINGS

FIG. 1 is a high-level diagram showing parties or entities that can interact with an advertising system.

FIG. 2 is a bubble chart of an exemplary advertising environment in which, or with which, the present invention may operate.

FIG. 4 illustrates an exemplary data structure for storing user profile information that may be generated, updated and/or used in a manner consistent with the present invention.

FIG. 5 illustrates possible components of an overall match value which may be a factor in an ad sore.

§4. DETAILED DESCRIPTION

Figure 3:
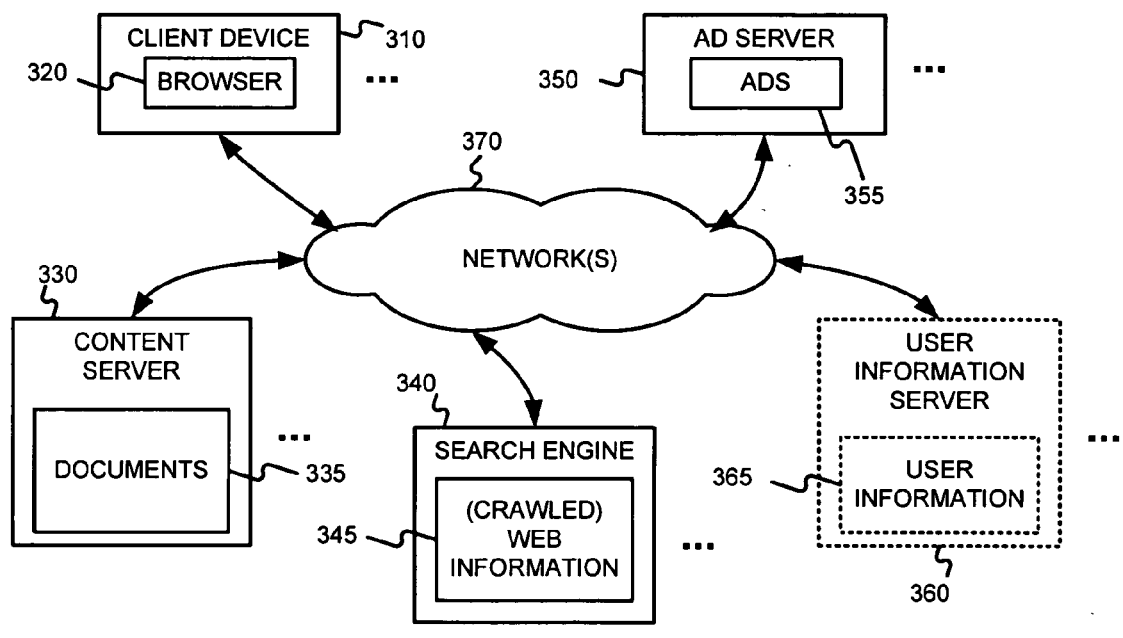
FIG. 3 is a bubble chart of operations, consistent with the present invention, which may be used in, or with, an online advertising environment, such as the one in FIG. 2.

The present invention may involve novel methods, apparatus, message formats and/or data structures for determining user profile information and using such determined user profile information for ad serving. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

One possible method to improve ad targeting is for ad targeting systems to obtain and use user profiles. For example, user profiles may be determined using information voluntarily given by users (e.g., when they subscribe to a service). This user attribute information may then be matched against advertiser specified attributes of the ad (e.g., targeting criteria). Unfortunately, user profile information is not always available since many Websites (e.g., search engines) do not require subscription or user registration. Moreover, even when available, the user profile may be incomplete (e.g., because the information given at the time of subscription may be limited to what is needed for the service and hence not comprehensive, because of privacy considerations, etc.). Furthermore, advertisers may need to manually define user profile targeting information. In addition, even if user profile information is available, advertisers may not be able to use this information to target ads effectively.

In the following, environments in which, or with which, the present invention may operate are described in §4.1. Then, exemplary embodiments of the present invention are described in §4.2. Some alternatives and refinements are described in §4.3. Finally, some conclusions regarding the present invention are set forth in §4.4.

§4.1 ENVIRONMENTS IN WHICH, OR WITH WHICH, THE PRESENT INVENTION MAY OPERATE

§4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the user. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web Pages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

FIG. 2 illustrates an exemplary ad system 120' in which, or with which, the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords.

The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. The ad serving operations 230 may then use relative presentation attribute assignment operations 250 to order the presentation of the ads to be returned. The accounting/billing operations 225 may be used to track charges related to the serving of advertisements and to bill advertisers. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

Various aspects of the present invention may be used with relevancy determination operations 235, relative presentation attribute ordering operations 250, and/or ad serving operations 230.

§4.1.3 Exemplary Network Environment

FIG. 3 illustrates an exemplary network environment 300 in which the present invention may be used. The exemplary network environment 300 may include one or more client devices 310, each having a browser 320 (or some other information requesting and rendering means). The client devices 310 can request documents 335 served by one or more content servers 320 and can search content included in those or other documents using one or more search engines 340. An ad server 350 can serve one or more ads 355. The one or more ads 355 served may be relevant to documents served by the content server 330 (and/or the request for such documents) and/or relevant to search results generated by search engine 340 (and/or the search query). User information (e.g., about an individual user or group of users associated with one or more client devices 310) 365 may be stored at one or more information servers 360. Alternatively, or in addition, user information (not shown) may be stored at one or more content servers 330, one or more search engines 340, and/or one or more ad servers 350. The one or more client devices 310, content servers 330, search engines 340, ad servers 350, and/or user information servers 360 may exchange information with one another via one or more networks 370. The one or more networks 370 may be the Internet and the servers and search engines may be computers. The user information (e.g., user profile database), an information index, and an advertisement index need not be separate repositories—they may be stored in a single repository. Moreover, these forms of data may be interleaved (for example, the advertisement database may include "user feature tags" on the ads so that only some subsets are retrieved for particular types of users).

§4.1.4 Definitions

Online ads, such as those used in the exemplary systems described above with reference to FIGS. 1, 2, 3 or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications. "Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User profile information" (also referred to as "UPI") may include any information about an individual user or a group of users. Such information may be provided by the user, provided by a third party authorized to release user information, and/or derived from user actions. Certain user information can be deduced or presumed using other user information of the same user and/or user information of other users. UPI may be associated with various entities. "User UPI" is user profile information associated with a particular user or a group of users. "Document UPI" is user profile information associated with a document. For example, a document UPI may be a composite representation of various user UPI's of users that have requested or visited the document. "Ad landing page UPI" is a particular type of document UPI and may be a composite representation of various users that have visited, or consummated a purchase on, a particular Web page, perhaps in response to their selecting (e.g., clicking) an ad. "Ad targeting UPI" may include user profile serving constraints. For example, an ad for prostate cancer screening might be limited to user profiles having the attribute "male" and "age 45 and over."

Various exemplary embodiments of the present invention are now described in §4.2.

§4.2 EXEMPLARY EMBODIMENTS

§4.2.1 Exemplary User Information

FIG. 4 is an exemplary data structure 400 that may be used to store user profile information (UPI) in a manner consistent with the present invention. Although not shown, that data structure 400 may include an identifier. Such an identifier may be used to associate the UPI with a particular user, a group of users, a document, an ad, an ad landing page, etc. The UPI may include one or more collections of information 410 related to one or more UPI attributes 420. Each attribute 420 may have an associated value 430 and a score 440.

The UPI attributes 420 may include information concerning user background and interests such as, for example, geographic information, age or age group, topics of interest, reading level, income and other demographics suited for targeting advertisements. A value 430 associated with a UPI attribute 420 may be quantitative (a discrete or continuous value, e.g., Age=58 years; Annual income=$55,000; City of residence=San Francisco, Calif.) or qualitative (in set or not in set, e.g., Salary $50,000-$100,000?=Yes; U.S. Resident?=Yes). Each UPI attribute 420 and value 430 may have an associated score 440 related to the probability of the attribute value being correct. Examples of UPI attributes may include one or more of the following:

- the content (e.g., words, Anchortext, etc.) of Websites that the user has visited (or visited in a certain time period);
- demographic information;
- geographic information;
- psychographic information;
- previous queries (and/or associated information) that the user has made;

information about previous advertisements that the user has been shown, has selected, and/or has made purchases after viewing;

information about documents (e.g., word processor) viewed/requested, and/or edited by the user;

user interests;

explicit or implicit feedback regarding the personalized results from the user (e.g., selecting a result, not selecting a result, the amount of time spent on a result, etc.);

browsing activity; and previous purchasing behavior.

Such information may be stored on a per individual basis (though it might not include personally identifiable information for reasons of privacy), or aggregated in various ways among various sets of individuals. Such information may be combined to obtain composite profiles.

§4.2.2 Exemplary Applications for Using UPI

There are many applications for using user profile information (UPI). Three exemplary applications—enhanced ad targeting, ad creative selection and generation, and resolving query ambiguity—are described below.

§4.2.2.1 Ad Scoring Using UPI

It may be desirable to place an ad on a hosting site or page where ad's targeted UPI (and/or the UPI of the ad's landing page) matches the document UPI (e.g., the average UPI of users that have requested the document) and/or to serve the ad to a user whose UPI matches the target UPI of the ad (and/or the UPI of the ad's landing page).

With enhanced ad targeting using UPI, a score for each of a plurality of ads may be determined using at least some of the UPI of the user, the UPI of a document, the UPI of an ad landing page, and/or ad targeting UPI. At least one ad may be rank ordered, filtered, and/or selected from the plurality of ads using at least the determined scores.

For example, an ad score may be a function of a UPI match value. Referring to FIG. 5, such a UPI match value may be a function of one or more of: (i) a match value of UPI information 514 associated with a user (or user group) 512 and UPI information 524 associated with a document (e.g., a Web page) requested (or visited) by the user 512 (Match Value 1); (ii) a match value of UPI information 514 associated with a user (or user group) 512 and UPI information 534 associated with a landing page 532 of an ad under consideration (Match Value 2); (iii) a match value of UPI information 524 associated with a document 522 requested (or visited) by a user and UPI information 534 associated with a landing page 532 of an ad under consideration (Match Value 3); (iv) a match value of UPI information 514 associated with a user (or user group) 512 and UPI ad targeting information 544 associated with an ad 542 under consideration (Match Value 4); and (v) a match value of UPI information 524 associated with a document 522 requested or being visited by a user and UPI ad targeting information 544 associated with an ad 542 under consideration (Match Value 5).

Thus, in one embodiment of the present invention, an overall match may be defined as:

$$UPI\ MATCH = a^*MATCH\ VALUE\ 1 + b^*MATCH\ VALUE\ 2 + c^*MATCH\ VALUE\ 3 + d^*MATCH\ VALUE\ 4 + e^*MATCH\ VALUE\ 5$$

where a, b, c, d, and e are constants (e.g., a=0.025, b=0.275, c=0.3, d=0.2, and e=0.2). Note that "a" may be set to zero since a match between a user UPI and a document UPI may be independent of how well either one matches an ad. Other functions, including polynomial or exponential functions, may be used instead.

Generally, for a good match, the user's UPI should match both the hosting page UPI, and perhaps even more importantly, match the UPI of the ad landing page. The match between two profiles can be computed using standard Information Retrieval techniques for matching two term vectors, such as vector space matching (See, e.g., the articles: G. Salton and C. Buckley, "Term-Weighting Approaches in Automatic Text Retrieval," *Information Processing and Management*, 24(5), pp. 513-523 (1988); and Gerard Salton, A. Wong, C. S. Yang, "A Vector Space Model for Automatic Indexing," *Communications of the ACM*, 18(11), pp. 613-620 (1975).).

Broad attributes such as geography, topic, user age range, language, etc. can be computed for documents and users using, for example, machine learning classifiers. Also, that such broad attributes can be used jointly with more narrow attributes, such as words and phrases, in matching.

Naturally, the score of an ad can be a function of other factors in addition to UPI Match, such as, for example, its relevancy to a search query or to content of a document, an amount an advertiser will pay or is willing to pay for a given result (e.g., impression, selection, conversion, etc.), a measure of the ad's performance (e.g., click-through rate, conversion rate, user rating, etc.), a measure of the advertiser's quality, etc. Moreover, different intermediate ad scores may be used for different purposes (e.g., relevancy, position, relative rendering attribute, etc.)

§4.2.2.2 Ad Creative Selection Using UPI

With ad creative selection and/or generation using UPI, ad creatives may be tailored to UPI (e.g., of the user, the document, etc.)

§4.2.2.3 Query Abiguity Resolution Using UPI

Besides selecting an appropriate ad or ad creative, UPI may be used to disambiguate a search query including an ambiguous search term. For example, a user submitting the search query "jaguar" might want either (A) information about Jaguar cars, (B) information about the animal, (C) information about the Apple Jaguar operating system, or (D) information about the Jacksonville Jaguar NFL football team. UPI of the user could be used to help disambiguate the "jaguar" search term. In this example, information from the user's previous browsing activity may help disambiguate the ambiguous query "jaguar", or prevent the display of advertisements of little or no interest to the user. For example, if the user had been recently querying for "apple computer" and "operating systems", and subsequently submitted the search query "jaguar", the user's previous query history could be used to infer that the query was more likely referring to the operating system for Apple computers and not to the car, animal, or NFL team. Consequently, ads could be better targeted to the user by harnessing such information.

These foregoing applications for using UPI, as well as others, presume that UPI is available. If, however, this is not the case, such UPI needs to be generated, and/or updated. Exemplary methods for determining and/or updating UPI are described in §4.2.3 below.

§4.2.3 Determining and/or Updating UPI

Recall that user profile information (UPI) can be determined using information provided by users when they subscribe to a service. However, in many cases, users will not volunteer information about themselves, or are simply not asked to volunteer such information. Further, even if users do volunteer such information, it may be incomplete (e.g., because the information given at the time of subscription may be limited to what is needed for the service and hence not comprehensive), it may be intentionally or unintentionally inaccurate, it may become stale, etc.

Similarly, UPI information may not be available for document which the user has requested or is visiting.

Although ads can have advertisers supply UPI information, doing so may be a burden to advertisers.

As described below, UPI for a user, a document, etc. can be determined (or updated or extended) even when no explicit information is given to the system. In the following, an initial (or baseline) UPI may be determined during a bootstrap phase. Such an initial UPI may use information inherent to the user, or to the document, or to the ad with which the UPI will be associated. An initial UPI may include some expressly entered UPI information, though it doesn't need to.

It may suffice to use such an initial or baseline UPI for applications such as ad scoring, ad creative selection, query ambiguity resolution. However, it may be desired to supplement the initial or baseline UPI during an expansion and/or reinforcement phase. Referring back to FIG. 4 for example, UPI 410 (e.g., of a user, or document, or ad, or ad landing page) may be expanded by adding values 430 to attributes 420 that either didn't exist previously, or that didn't have a value. Alternatively, or in addition, scores of 440 of a value 430 of an attribute 420 of the UPI 410 may be revised or reinforced. Thus, for example, the probability of attribute=sex having a value=male may increase or decrease given additional information. Information used to expand or supplement an initial UPI may be thought of as inferred information.

Figure 6:
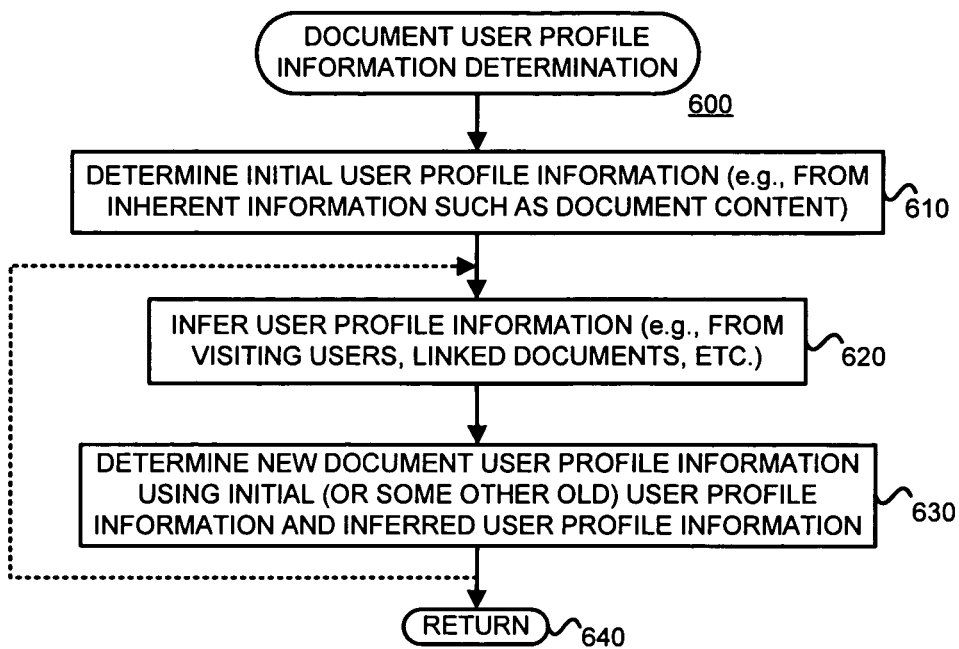
FIG. 6 is a flow diagram of an exemplary method 600 that may be used to determine document UPI in a manner consistent with the present invention.

FIG. 6 is a flow diagram of an exemplary method 600 that may be used to determine document UPI in a manner consistent with the present invention. An initial UPI for the document is determined. (Block 610) This may be done using information inherent to the document, such as the document content. An exemplary method for performing this act is described below with reference to FIG. 8. Further UPI information for the document is inferred. (Block 620) This may be done using information inferred from visiting users, linked documents, etc. Then, a new (e.g., expanded and/or reinforced) document UPI is determined using the initial document UPI and the inferred document UPI. (Block 630) Acts 620 and 630 may be performed one or more times before the method 600 is left. (Node 640). If acts 620 and 630 are repeated, as indicated by the phantom branch-back line, the new document UPI may be determined using the previous document UPI and more inferred document UPI.

Figure 7:
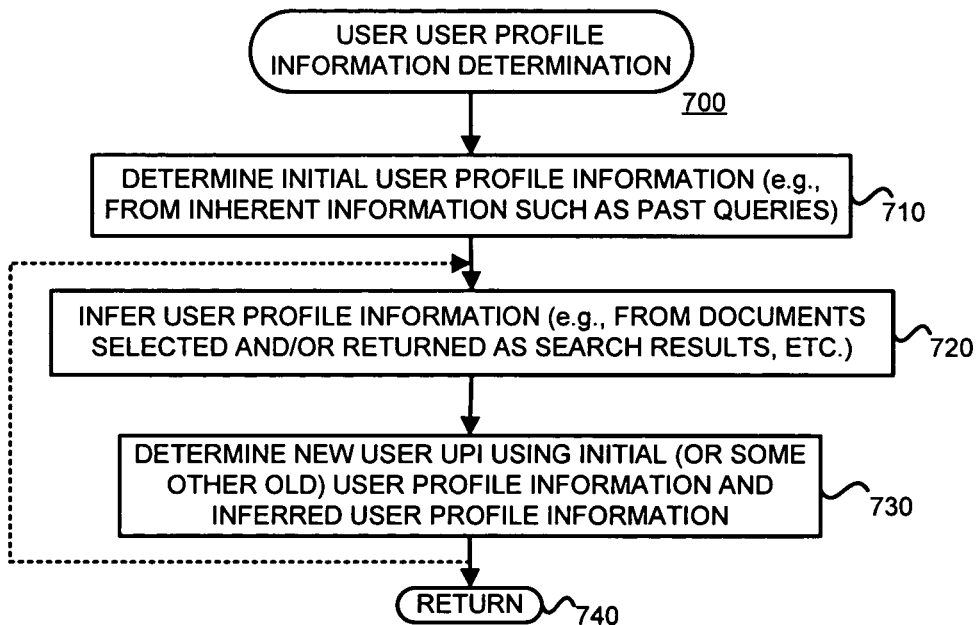
FIG. 7 is a flow diagram of an exemplary method 700 that may be used to determine user UPI in a manner consistent with the present invention.

FIG. 7 is a flow diagram of an exemplary method 700 that may be used to determine user (as an individual or a group) UPI in a manner consistent with the present invention. An initial UPI for the user is determined. (Block 710) This may be done using information inherent to the user, such as past search queries submitted by the user. An exemplary method for performing this act is described below with reference to FIG. 9. Further UPI information for the user is inferred. (Block 720) This may be done using information inferred from search results, selected search results, etc. Then, a new (e.g., expanded and/or reinforced) user UPI is determined using the initial user UPI and the inferred user UPI. (Block 730) Acts 720 and 730 may be performed one or more times before the method 700 is left. (Node 740). If acts 720 and 730 are repeated, as indicated by the phantom branch back-line, the new user UPI may be determined using the previous user UPI and more inferred user UPI.

Figure 8:
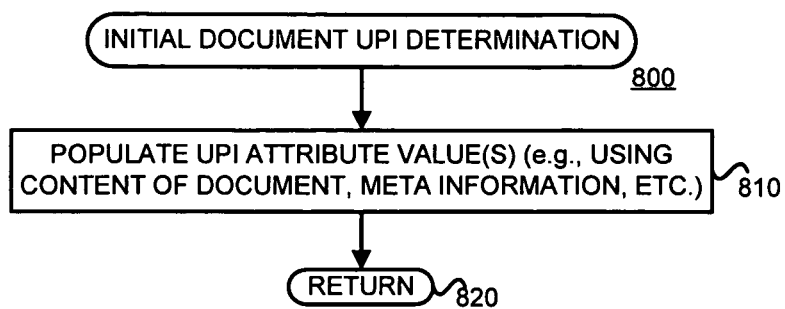
FIG. 8 is a flow diagram of an exemplary method 800 that may be used to determine an initial or baseline document UPI in a manner consistent with the present invention.

Recall from block 610 of FIG. 6 that initial document UPI may be determined. FIG. 8 is a flow diagram of an exemplary method 800 that may be used to determine an initial or baseline document UPI in a manner consistent with the present invention. As shown, document UPI attribute values may be populated (e.g., using content of the document, meta information of the document, etc.). (Block 810).

Figure 9:
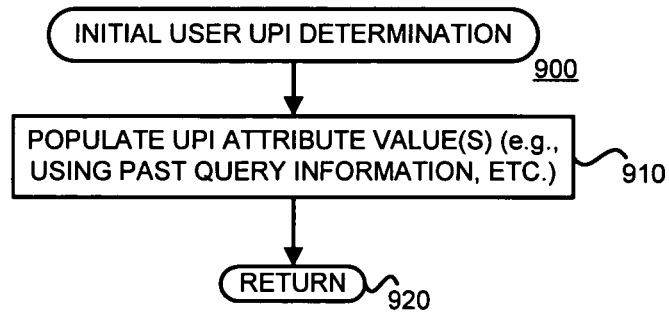
FIG. 9 is a flow diagram of an exemplary method 900 that may be used to determine an initial or baseline user UPI in a manner consistent with the present invention.

Recall from block 710 of FIG. 7 that initial user UPI may be determined. FIG. 9 is a flow diagram of an exemplary method 900 that may be used to determine an initial or baseline user UPI in a manner consistent with the present invention. As shown, user UPI attribute values may be populated (e.g., using past query information of the user, information expressly entered by the user, etc.). (Block 910).

§4.2.4 Examples of how User Information is Obtained

There are many alternative ways to obtain user information. For example, a score 440 for an attribute 420 and value 430 can be determined with a machine learning classifier which predicts values 430 of the UPI attributes 420 in the profile using words in queries deployed previously. For example, given the keywords related to "women's health" in previous search queries, the classifier may infer that the user is a woman with probability 0.8. Further, given that Japanese words were used in previous search queries, the classifier may infer that the user is Japanese with probability 0.9, etc. The scores 440 of two UPIs may affect whether or not they match. Attribute 420 may be "San Francisco" in one UPI and "San Jose" in another. Although these raw attributes do not match, a machine learning classifier may assign a geographic category="California" in both cases and the generalized profile attributes will match. Thus, the machine learning classifier may be used to classify users and documents into broad categories relating to geography, topic, ethnicity, or reading level.

Figure 10:
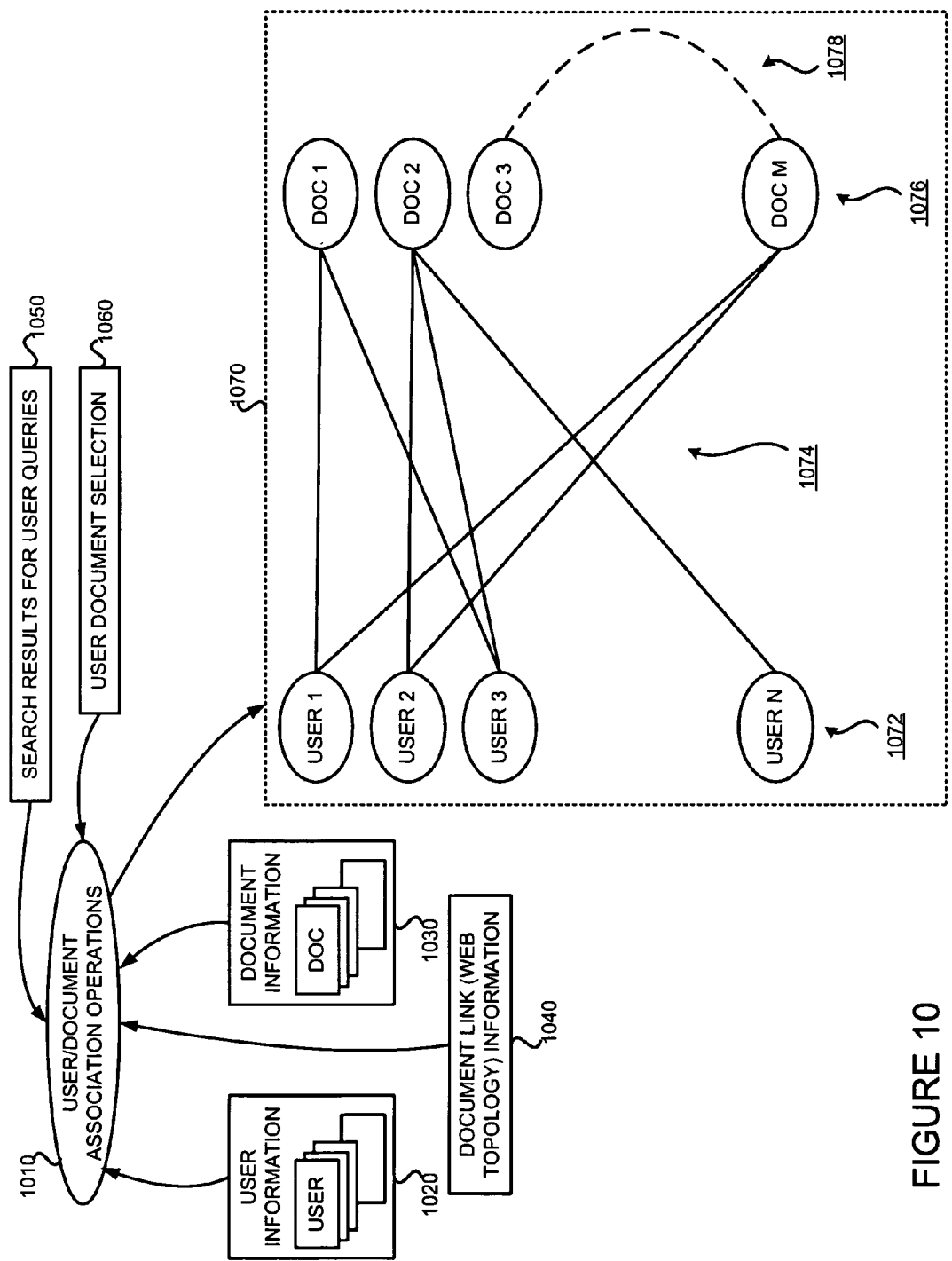
FIG. 10 illustrates how users and documents can be associated.

Recall from both block 620 of FIGS. 6 and 720 of FIG. 7 that UPI information may be inferred. User UPI may be inferred from UPI of other users and/or documents associated in some way with the user. Similarly, document UPI may be inferred from UPI of other documents, and/or users associated in some way with the document. FIG. 10 illustrates how users and documents can be associated.

As shown in FIG. 10, user/document association operations 1010 may generate information 1070 associating users and/or documents (user-to-user, user-to-document, document-to-document, and/or document-to-user (which may be the same as a user-to-document association in an undirected graph such as the one shown)) using one or more of user information 1020 of one or more users, document information 1030 of one or more documents, document link (e.g., Web topology) information 1040, search results for user queries 1050 (which may be provided as user information 1020 instead), and user document selections 1060 (which may be provided as user information 1030 instead).

Figure 11:
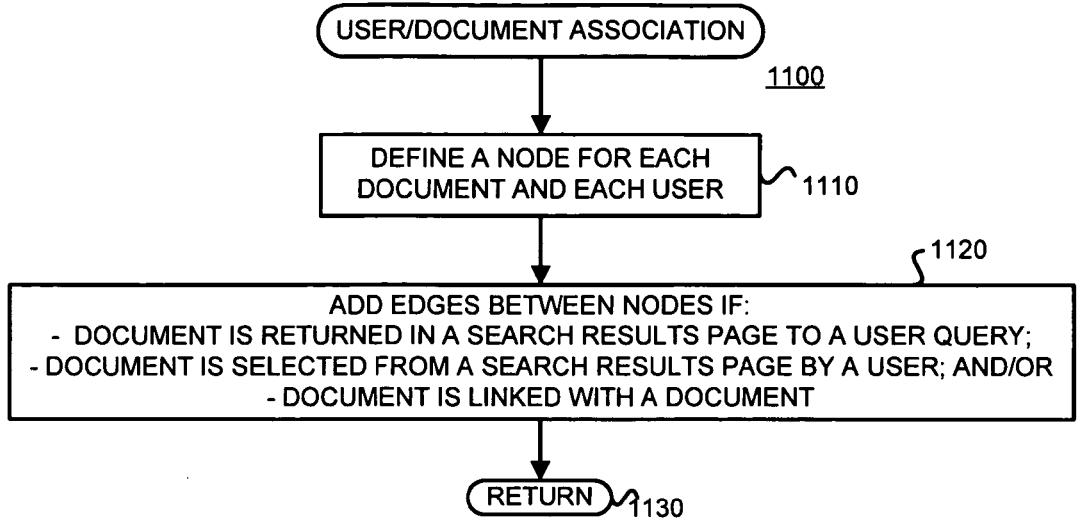
FIG. 11 is a flow diagram of an exemplary method 1100 that may be used to associated users and/or documents in a manner consistent with the present invention.

In one exemplary embodiment of the present invention, the association information 1070 may be a graph in which users and documents are represented as nodes 1072 and 1076, respectively. FIG. 11 is a flow diagram of an exemplary method 1100 that may be used to associate users and/or documents in a manner consistent with the present invention. As shown, nodes may be defined for each user and document. (Block 1110) For each of the user nodes 1072, edges 1074 (which indicate an association) may be drawn between the user node and document nodes for the top Web pages that were returned by a search engine in response to search queries that the user submitted. (In a variant, the edges 1074 could be drawn only to Web pages that the user selected (e.g., clicked on)). Additionally, edges 1078 may be drawn between pairs of documents that have links (e.g., hyperlinks) between them. (Block 1120) Although not shown, user-to-user associations may also be generated. For example, edges may be added between users that have visited one or more of the same documents.

Referring back to FIG. 7, given this graph 1070, new UPI for a user may be determined using their initial UPI and, as inferred user UPI, the UPIs of documents corresponding to nodes 1076 with which the user node 1072 is linked. Similarly, referring back to FIG. 6, given this graph 1070, new UPI for a document may be determine using its initial UPI and, as inferred document UPI, the UPIs of users and documents corresponding to nodes 1072 and 1076, respectively, with which the document node 1076 is linked.

Referring back to blocks 630 and 730 of FIGS. 6 and 7 respectively, in one embodiment of the present invention:

$$updated\_UPI = initial\_UPI * alpha + neighborhood\_UPI * beta$$

where alpha and beta are constants (e.g., alpha=0.7 beta=0.3) and neighborhood_UPI is the average of the UPIs of the neighboring nodes in the graph. Other functions for updating UPI are possible. This process may be repeated for a number (e.g., 50) of iterations.

To determine an average UPI, the values 430 of individual attributes 420 may be averaged, perhaps weighted by scores 440.

More distant nodes (e.g., two or more edges away) may also be considered, but should be weighted less.

Although both user UPI and document UPI may be updated, it is possible to update only one or the other.

In alternative embodiments, a user node 1072 may represent an aggregation of users. Similarly, a document node 1076 may represent an aggregation of documents (e.g., a Website containing a number of Web pages).

In alternative embodiments, graph edges can be assigned association weights. Thus, for example, an edge 1074 from a user node 1072 to a document node 1076 may be provided with a larger weight if the user selected the document from a search result list, than if the document was merely included on a search results list returned in response to a user search query.

§4.2.5 Exemplary Apparatus

Figure 12:
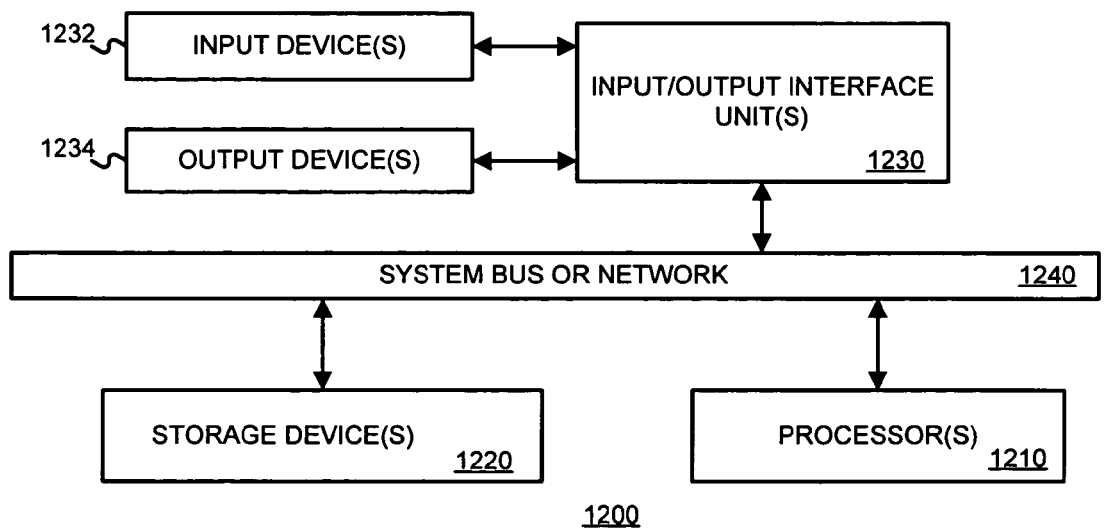
FIG. 12 is a block diagram of apparatus that may be used to effect at least some of the various operations that may be performed, and to store information that may be used and/or generated, in a manner consistent with the present invention.

FIG. 12 is high-level block diagram of a machine 1200 that may effect one or more of the operations discussed above (e.g., those performed by an end user system or client device, those performed by a content server, those performed by a search engine, or those performed by an ad server). The machine 1200 basically includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230.

The one or more processors 1210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1220 and/or may be received from an external source via one or more input interface units 1230.

In one embodiment, the machine 1200 may be one or more conventional personal computers. In this case, the processing units 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface. In addition to (or instead of) the monitor, the personal computer may include other (peripheral) output devices (not shown), such as speakers and printers for example.

§4.3 REFINEMENTS AND ALTERNATIVES

§4.3.1 Determination Techniques

Matching (or similarity) determination can be performed in a number of ways. For example, one or more of the following similarity determination techniques may be used: (a) vector-based (as described below for example); (b) rule-based (as described below for example); (c) probabilistic reasoning to infer a probability or likelihood of match; and (d) fuzzy logic matching. Other similarly determination techniques may be used under the present invention as well.

As just alluded to, one way of determining similarity is to form UPI vectors. Each of a plurality of advertisements may also have a representative targeting UPI vector. Note that such UPI vectors may also include additional information determined from historical data. For example, inferences about which demographic groups tend to click on an ad may be determined using data mining techniques. The results of this (e.g., off-line) analysis may then be used as one or more attributes in a UPI targeting vector of the ads. UPI vectors can be matched using a scoring function such as the cosine distance between the vectors, a hamming distance, and/or any one of a variety of other vector distance measures. Advertisements can then be ranked using (e.g., according to) the scores generated by such a function.

As also indicated above, another technique for matching UPI involves applying a set of rules and/or functions that define a similarity of pairs of one or more of user, document, ad and ad landing page UPIs. Such a rule and/or formula-based system can use arbitrary combinations of logical rules (e.g., with weights attached) to give weighted scores.

As stated above, the vector-based techniques and the rules and/or formula-based techniques may be used in concert to generate a match determination.

In one embodiment of the present invention, an attribute frequency—inverse document (or user) frequency product (TF-IDF) measure is determined using UPIs to generate a similarity score.

§4.3.1.1 Refinements to Similarity Determination Techniques

To keep the process of matching UPIs efficient, attribute selection, attribute generalization, and/or attribute aggregation techniques may be used to reduce the sizes of the vectors being compared. For example, attribute selection may be used to reduce the number, and/or size of the attributes used as part of the matching process between UPIs. Such attribute selection techniques may include keeping only some number of attributes having a high score (in absolute and/or relative terms) (e.g., probability or importance weight) in the vector representation of the UPIs. Another attribute selection technique may include using a statistical measure, such as "mutual Information", Chi-squared fit, or correlation for example, to determine which attributes are more indicative than others for generating one or more matches that are likely to perform well (e.g., be clicked on). Yet another attribute selection technique is simply hand-selecting those attributes believed to be most useful. Two or more of these or other attribute selection techniques may be used in concert.

Similarly, ad UPI vectors may be pre-filtered using some set of initial criteria (for example, matching certain features exactly) so that only a small subset of the ad UPI vectors remaining will need to be ranked with respect to the user and of document UPIs. This technique illustrates a combined rule-based and vector distance similarity determination technique. Using this technique has the added advantage of helping to increase the efficiency of the overall matching process between the UPIs.

For example, a first set of one or more ads generally relevant to a user and/or a document may be determined first. This first set of one or more ads may be processed further using UPI information operations to determine a final set of ads (e.g., ordered and/or filtered based on a second similarity score determined using UPI). Such an embodiment may be useful when (part of) the UPI is stored on the client. For example, an ad server may send the top N (e.g., N=100) ads for a user request (e.g., a search query or a document request) to the client. The client can then reorder these served ads based on the local user information.

§4.3.2 Examples of how and where UPI is Stored

In one embodiment of the present invention, UPI is stored as n-grams (sequences of words of length 1 to some maximum, e.g., 3) with an associated source (e.g., the n-gram is from a Web page viewed, a query, etc.), URLs, or specific values for different kinds of information (e.g., the user is using a particular web browser, or the user is located at a specific latitude and longitude, etc.).

The storage and use of UPI may take various different forms, including (a) client-side storage (e.g., in the form of a browser cookie, local file, hidden form fields, or URL encoding), (b) server-side storage (e.g., a database of records, flat files, or proprietary structures for storing and retrieving profile/behavior information), and/or (c) third party storage. Thus, the UPI need not reside in a repository on the server-side, but may actually be stored with the client and/or a third party and sent to the information server with the user's request (e.g., search query or document request). The UPI can be sent, for example, in a web browser cookie.

Referring back to the exemplary network environment of FIG. 3, UPI may be stored in one or more client devices 320, one or more content servers 330, one or more search engines 340, one or more ad servers 350, and/or one or more user information servers 360. In any event, user information may be maintained by using some data management scheme (e.g., database, flat files, proprietary data management system, web browser cookies, etc.). Different items of user information (e.g., different user features) may be stored on different devices.

§4.3.2.1 Refinements to Information Storage

To achieve a practical system, it may become desirable or necessary to reduce the volume of, and/or to order, UPI used in targeting advertisements. The present invention permits such reduction with minimal loss of information and accuracy. Further, since it may be desirable or necessary to constrain latency in the serving of ads, and consequently in the retrieval of UPI, an ad server may need to operate in some cases with limited or no UPI. Prioritization, in a manner consistent with the present invention, allows an ad server to focus on valuable (e.g., the most valuable) information available during the targeting process. Exemplary techniques for data reduction and processing prioritization are described below.

In one embodiment of the present invention, each of at least some UPI attributes has an associated score (importance weight, probability, etc.). The importance weights for multiple UPI attributes may be grouped together or aggregated in some manner.

Initially, the importance weight assigned to a UPI attribute may be determined using, perhaps among other things, a type of the information. For example search queries may have a higher initial weight than n-grams extracted from Web pages that a user has viewed.

The importance weights for UPI attributes may be updated based on actions of a particular user or of groups of users. For example, FIG. 9 of U.S. patent application Ser. No. 10/452, 791, titled "SERVING ADVERTISEMENTS USING USER REQUEST INFORMATION AND USER INFORMATION," filed on Jun. 2, 2003 and listing Steve Lawrence, Mehran Sahami and Amit Singhal as inventors (incorporated herein by reference and referred to as "the '791 application") illustrates an exemplary method that may be used to manage ad UPI or user UPI in a manner consistent with the present invention. In that exemplary method, for example, if the user selects an ad, the importance weights of user UPI attributes that led to this ad being recommended may be increased. The amount(s) (absolute or relative) by which the importance weight(s) are increased may depend, at least in part, on how much each UPI attribute contributed to the ad recommendation score. Similarly, the importance weights of the relevant UPI attributes may be reduced when the user does not select the ad. In one embodiment of the present invention, the weight reduction factor is smaller than the weight increase factor.

In one embodiment of the present invention, importance weights may be optionally adjusted using (e.g., combined with) a global weight based on how often (in absolute and/or relative terms) the UPI attribute has resulted in a good recommendation across all users. Alternatively, or in addition, importance weights may be optionally adjusted using (e.g., combined with) a community weight based on how often (in absolute and/or relative terms) the UPI attribute has resulted in a good recommendation across a group of (e.g., all similar) users.

In one embodiment of the present invention, if a UPI reaches a particular size, it may be reduced by deleting less important items of information using, at least, the importance weights. The storage requirements of the UPI attributes may also be considered. In this way, a UPI attribute that requires a lot of storage but that has a low importance weight would be a prime candidate for deletion.

One embodiment of the present invention can order (and even store) the individual UPI attributes using their importance weights. In such an embodiment, requests for a given user UPI may be served with truncated UPI including only the most important (in terms of importance weights) attributes, or may be served in a piecemeal manner until enough information is obtained, and/or until further processing is undesirable or not possible. Thus, for example, processing using UPI attributes may be done in the order of their importance weights. This permits processing to be terminated early (e.g., for efficiency, to meet some latency constraint and ensure that processing is completed within a specific time limit, etc.).

As new UPI attributes are added, the importance weights of existing attributes may be changed. Consequently, the order of UPI attributes (e.g., for a given user) may differ from the importance weight order. Therefore, the present invention may be used to reorder, periodically, the UPI attributes using (e.g., according to) their respective importance weights.

In some cases, transfer or processing of the UPI may be performed in accordance with an approximate order, before the UPI (e.g., for a given user) is reordered using (e.g., in accordance with) importance weight. Note that in at least some instances and/or some embodiments, it may not be necessary to physically store UPI attributes in the order of their respective importance weights for such information to be efficiently transferred and/or processed in that order. Indeed, in at least some instances and/or some embodiments, it may not be necessary to transfer and/or process UPI attributes in importance order. For example, if conditions permit, all information may be transferred and/or processed.

§4.4 CONCLUSIONS

As can be appreciated from the foregoing disclosure, the present invention can be used to improve content-targeted ad systems, as well as keyword-targeted ad systems. User profile information of users, documents, ads and/or ad landing pages can be accepted and/or inferred.

What is claimed is:

1. A computer-implemented method for determining user profile information for a user, the computer-implemented method comprising:
determining, by a computer system including at least one computer on a network, initial user profile information for the user;
obtaining, by the computer system, inferred user profile information for the user;
determining, by the computer system, user profile information for the user using both the initial user profile information and the inferred user profile information;
serving, by the computer system, an advertisement to the user using the user profile information;
wherein obtaining the inferred user profile information for the user includes:
i) defining a separate node for each of a number of documents and the user, wherein each node represents a particular one of the number of documents or the user;
ii) adding edges between nodes; and
iii) inferring a user profile information for the user using a topology of a graph of the nodes and the edges and using user profile information of other documents;
determining, by the computer system, that at least one document corresponding to a first node was returned in a search results page in response to a search query from the user corresponding to a second node; and
based on determining that the at least one document was returned, adding, by the computer system, an edge between the first node and the second node.

2. A computer-implemented method for determining user profile information for a user, the computer-implemented method comprising:
determining, by a computer system including at least one computer on a network, initial user profile information for the user;
obtaining, by the computer system, inferred user profile information for the user;
determining, by the computer system, user profile information for the user using both the initial user profile information and the inferred user profile information;
serving, by the computer system, an advertisement to the user using the user profile information
wherein obtaining the inferred user profile information for the user includes:
i) defining a separate node for each of a number of documents and the user, wherein each node represents a particular one of the number of documents or the user;
ii) adding edges between nodes; and
iii) inferring a user profile information for the user using a topology of a graph of the nodes and the edges and using user profile information of other documents;
determining, by the computer system, that a document corresponding to a first node was selected by the user corresponding to a second node; and
based on determining that the document was selected, adding, by the computer system, an edge between the first node and the second node.

3. A computer-implemented method for determining user profile information for a user, the computer-implemented method comprising:
determining, by a computer system including at least one computer on a network, initial user profile information for the user;
obtaining, by the computer system, inferred user profile information for the user;
determining, by the computer system, user profile information for the user using both the initial user profile information and the inferred user profile information;
serving, by the computer system, an advertisement to the user using the user profile information
wherein obtaining the inferred user profile information for the user includes:
i) defining a separate node for each of a number of documents and the user, wherein each node represents a particular one of the number of documents or the user;
ii) adding edges between nodes; and
iii) inferring a user profile information for the user using a topology of a graph of the nodes and the edges and using user profile information of other documents;

determining, by the computer system, that a document corresponding to a first node is linked with a document corresponding to a second node; and based on determining that the document is linked, adding, by the computer system, an edge between the first node and the second node.

4. A computer-implemented method for determining user profile information for a user, the computer-implemented method comprising:

determining, by a computer system including at least one computer on a network, initial user profile information for the user;

obtaining, by the computer system, inferred user profile information for the user;

determining, by the computer system, user profile information for the user using both the initial user profile information and the inferred user profile information;

serving, by the computer system, an advertisement to the user using the user profile information wherein obtaining the inferred user profile information for the user includes:
  i) defining a separate node for each of a number of documents and the user, wherein each node represents a particular one of the number of documents or the user;
  ii) adding edges between nodes; and
  iii) inferring a user profile information for the user using a topology of a graph of the nodes and the edges and using user profile information of other documents;

determining, by the computer system, that a document corresponding to a first node was visited by a set of users that have visited another document corresponding to a second node; and based on determining that the document was visited, adding, by the computer system, an edge between the first node and the second node.

5. A computer-implemented method for determining user profile information for a user, the computer-implemented method comprising:

determining, by a computer system including at least one computer on a network, initial user profile information for the user;

obtaining, by the computer system, inferred user profile information for the user;

determining, by the computer system, user profile information for the user using both the initial user profile information and the inferred user profile information;

serving, by the computer system, an advertisement to the user using the user profile information;

wherein obtaining the inferred user profile information for the user includes:
  i) defining a separate node for each of a number of documents and the user, wherein each node represents a particular one of the number of documents or the user;
  ii) adding edges between nodes; and
  iii) inferring a user profile information for the user using a topology of a graph of the nodes and the edges and using user profile information of other documents;

determining, by the computer system, that a user corresponding to a first node visited a set of one or more documents also visited by another user corresponding to a second node; and based on determining that the user visited the set of one or more documents, adding, by the computer system, an edge between the first node and the second node.

6. A computer-implemented method for determining user profile information for a document, the computer-implemented method comprising:

determining, by a computer system including at least one computer on a network, initial user profile information for the document;

obtaining, by the computer system, inferred user profile information for the document;

determining, by the computer system, user profile information for the document using both the initial user profile information and the inferred user profile information;

associating, by the computer system, with the document, the user profile information for the document;

storing, by the computer system, the association of the document with the user profile information for the document;

serving, by the computer system, an advertisement with the document using the user profile information for the document stored in association with the document;

wherein obtaining the inferred user profile information for the document includes:
  i) defining a separate node for each of a number of documents and for each of a number of users, wherein each node represents a particular one of the number of documents or a particular one of the number of users;
  ii) adding edges between nodes; and
  iii) inferring a user profile information for the document using a topology of a graph of the nodes and the edges and using user profile information of users and of other documents;

determining, by the computer system, that at least one document corresponding to a first node was returned in a search results page in response to a search query from the user corresponding to a second node; and based on determining that the at least one document was returned, adding, by the computer system, an edge between the first node and the second node.

7. A computer-implemented method for determining user profile information for a document, the computer-implemented method comprising:

determining, by a computer system including at least one computer on a network, initial user profile information for the document;

obtaining, by the computer system, inferred user profile information for the document;

determining, by the computer system, user profile information for the document using both the initial user profile information and the inferred user profile information;

associating, by the computer system, with the document, the user profile information for the document;

storing, by the computer system, the association of the document with the user profile information for the document;

serving, by the computer system, an advertisement with the document using the user profile information for the document stored in association with the document;

wherein obtaining the inferred user profile information for the document includes:
  i) defining a separate node for each of a number of documents and for each of a number of users, wherein each node represents a particular one of the number of documents or a particular one of the number of users;
  ii) adding edges between nodes; and iii) inferring a user profile information for the document using a topology of a graph of the nodes and the edges and using user profile information of users and of other documents;

determining, by the computer system, that at least one document corresponding to a first node was selected by the user corresponding to a second node; and based on determining that the document was selected, adding, by the computer system, an edge between the first node and the second node.

8. A computer-implemented method for determining user profile information for a document, the computer-implemented method comprising:

determining, by a computer system including at least one computer on a network, initial user profile information for the document;

obtaining, by the computer system, inferred user profile information for the document;

determining, by the computer system, user profile information for the document using both the initial user profile information and the inferred user profile information;

associating, by the computer system, with the document, the user profile information for the document;

storing, by the computer system, the association of the document with the user profile information for the document;

serving, by the computer system, an advertisement with the document using the user profile information for the document stored in association with the document;

wherein obtaining the inferred user profile information for the document includes:
i) defining a separate node for each of a number of documents and for each of a number of users, wherein each node represents a particular one of the number of documents or a particular one of the number of users;
ii) adding edges between nodes; and
iii) inferring a user profile information for the document using a topology of a graph of the nodes and the edges and using user profile information of users and of other documents;

determining, by the computer system, that a document corresponding to a first node is linked with a document corresponding to a second node; and based on determining that the document is linked, adding, by the computer system, an edge between the first node and the second node.

9. A computer-implemented method for determining user profile information for a document, the computer-implemented method comprising:

determining, by a computer system including at least one computer on a network, initial user profile information for the document;

obtaining, by the computer system, inferred user profile information for the document;

determining, by the computer system, user profile information for the document using both the initial user profile information and the inferred user profile information;

associating, by the computer system, with the document, the user profile information for the document;

storing, by the computer system, the association of the document with the user profile information for the document;

serving, by the computer system, an advertisement with the document using the user profile information for the document stored in association with the document;

wherein obtaining the inferred user profile information for the document includes:
i) defining a separate node for each of a number of documents and for each of a number of users, wherein each node represents a particular one of the number of documents or a particular one of the number of users;
ii) adding edges between nodes; and
iii) inferring a user profile information for the document using a topology of a graph of the nodes and the edges and using user profile information of users and of other documents;

determining, by the computer system, that a document corresponding to a first node was visited by a set of users that have visited another document corresponding to a second node; and based on determining that the document was visited, adding, by the computer system, an edge between the first node and the second node.

10. A computer-implemented method for determining user profile information for a document, the computer-implemented method comprising:

determining, by a computer system including at least one computer on a network, initial user profile information for the document;

obtaining, by the computer system, inferred user profile information for the document;

determining, by the computer system, user profile information for the document using both the initial user profile information and the inferred user profile information;

associating, by the computer system, with the document, the user profile information for the document;

storing, by the computer system, the association of the document with the user profile information for the document;

serving, by the computer system, an advertisement with the document using the user profile information for the document stored in association with the document;

wherein obtaining the inferred user profile information for the document includes:
i) defining a separate node for each of a number of documents and for each of a number of users, wherein each node represents a particular one of the number of documents or a particular one of the number of users;
ii) adding edges between nodes; and
iii) inferring a user profile information for the document using a topology of a graph of the nodes and the edges and using user profile information of users and of other documents;

determining, by the computer system, that a user corresponding to a first node visited a set of one or more documents also visited by another user corresponding to a second node; and based on determining that the user visited the set of one or more documents, adding, by the computer system, an edge between the first node and the second node.

11. Apparatus for determining user profile information for a user, the apparatus comprising:
at least one processor;
an input device; and
at least one storage device storing a computer executable code which, when executed by the at least one processor, causes the at least one processor to perform a method of:
determining initial user profile information for the user;
obtaining inferred user profile information for the user;

determining user profile information for the user using both the initial user profile information and the inferred user profile information;

serving an advertisement to the user using the user profile information;

wherein obtaining the inferred user profile information for the user includes:
  i) defining a separate node for each of a number of documents and the user, wherein each node represents a particular one of the number of documents or the user;
  ii) adding edges between nodes; and
  iii) inferring a user profile information for the user using a topology of a graph of the nodes and the edges and using user profile information of other documents;

determining that at least one document corresponding to a first node was returned in a search results page in response to a search query from the user corresponding to a second node; and based on determining that the at least one document was returned, adding an edge between the first node and the second node.

12. Apparatus for determining user profile information for a user, the apparatus comprising:
  at least one processor;
  an input device; and
  at least one storage device storing a computer executable code which, when executed by the at least one processor, causes the at least one processor to perform a method of:
    determining initial user profile information for the user;
    obtaining inferred user profile information for the user;
    determining user profile information for the user using both the initial user profile information and the inferred user profile information;
    serving an advertisement to the user using the user profile information;
  wherein obtaining the inferred user profile information for the user includes:
    i) defining a separate node for each of a number of documents and the user, wherein each node represents a particular one of the number of documents or the user;
    ii) adding edges between nodes; and
    iii) inferring a user profile information for the user using a topology of a graph of the nodes and the edges and using user profile information of other documents;
    determining that a document corresponding to a first node was selected by the user corresponding to a second node; and
    based on determining that the document was selected, adding an edge between the first node and the second node.

13. Apparatus for determining user profile information for a user, the apparatus comprising:
  at least one processor;
  an input device; and
  at least one storage device storing a computer executable code which, when executed by the at least one processor, causes the at least one processor to perform a method of:
    determining initial user profile information or the user;
    obtaining inferred user profile information for the user;
    determining user profile information for the user using both the initial user profile information and the inferred user profile information;
    serving an advertisement to the user using the user profile information;
  wherein obtaining the inferred user profile information for the user includes:
    i) defining a separate node for each of a number of documents and the user, wherein each node represents a particular one of the number of documents or the user;
    ii) adding edges between nodes; and
    iii) inferring a user profile information for the user using a topology of a graph of the nodes and the edges and using user profile information of other documents;
    determining that a document corresponding to a first node is linked with a document corresponding to a second node; and
    based on determining that the document is linked, adding an edge between the first node and the second node.

14. Apparatus for determining user profile information for a user, the apparatus comprising:
  at least one processor;
  an input device; and
  at least one storage device storing a computer executable code which, when executed by the at least one processor, causes the at least one processor to perform a method of:
    determining initial user profile information for the user;
    obtaining inferred user profile information for the user;
    determining user profile information for the user using both the initial user profile information and the inferred user profile information;
    serving an advertisement to the user using the user profile information;
  wherein obtaining the inferred user profile information for the user includes:
    i) defining a separate node for each of a number of documents and the user, wherein each node represents a particular one of the number of documents or the user;
    ii) adding edges between nodes; and
    iii) inferring a user profile information for the user using a topology of a graph of the nodes and the edges and using user profile information of other documents;
    determining that a document corresponding to a first node was visited by a set of users that have visited another document corresponding to a second node; and
    based on determining that the document was visited, adding an edge between the first node and the second node.

15. Apparatus for determining user profile information for a user, the apparatus comprising:
  at least one processor;
  an input device; and
  at least one storage device storing a computer executable code which, when executed by the at least one processor, causes the at least one processor to perform a method of:
    determining initial user profile information for the user;
    obtaining inferred user profile information for the user;
    determining user profile information for the user using both the initial user profile information and the inferred user profile information;
    serving an advertisement to the user using the user profile information;
  wherein obtaining the inferred user profile information for the user includes:
    i) defining a separate node for each of a number of documents and the user, wherein each node represents a particular one of the number of documents or the user;

ii) adding edges between nodes; and iii) inferring a user profile information for the user using a topology of a graph of the nodes and the edges and using user profile information of other documents;

determining that a user corresponding to a first node visited a set of one or more documents also visited by another user corresponding to a second node; and based on determining that the user visited the set of one or more documents, adding an edge between the first node and the second node.

16. Apparatus for determining user profile information for a document, the apparatus comprising:

at least one processor;

an input device; and at least one storage device storing a computer executable code which, when executed by the at least one processor, causes the at least one processor to perform a method of:

determining initial user profile information for the document;

obtaining inferred user profile information for the document;

determining user profile information for the document using both the initial user profile information and the inferred user profile information;

associating with the document, the user profile information for the document;

storing the association of the document with the user profile information for the document;

serving an advertisement with the document using the user profile information for the document stored in association with the document;

wherein obtaining the inferred user profile information for the document includes:

i) defining a separate node for each of a number of documents and for each of a number of users;

ii) adding edges between nodes; and iii) inferring a user profile information for the document using a topology of a graph of the nodes and the edges and using user profile information of users and of other documents;

determining that at least one document corresponding to a first node was returned in a search results page in response to a search query from the user corresponding to a second node; and based on determining that the at least one document was returned, adding an edge between the first node and the second node.

17. Apparatus for determining user profile information for a document, the apparatus comprising:

at least one processor;

an input device; and at least one storage device storing a computer executable code which, when executed by the at least one processor, causes the at least one processor to perform a method of:

determining initial user profile information for the document;

obtaining inferred user profile information for the document;

determining user profile information for the document using both the initial user profile information and the inferred user profile information;

associating with the document, the user profile information for the document;

storing the association of the document with the user profile information for the document;

serving an advertisement with the document using the user profile information for the document stored in association with the document;

wherein obtaining the inferred user profile information for the document includes:

i) defining a separate node for each of a number of documents and for each of a number of users;

ii) adding edges between nodes; and iii) inferring a user profile information for the document using a topology of a graph of the nodes and the edges and using user profile information of users and of other documents;

determining that a document corresponding to a first node was selected by the user corresponding to a second node; and based on determining that the document was selected, adding an edge between the first node and the second node.

18. Apparatus for determining user profile information for a document, the apparatus comprising:

at least one processor;

an input device; and at least one storage device storing a computer executable code which, when executed by the at least one processor, causes the at least one processor to perform a method of:

determining initial user profile information for the document;

obtaining inferred user profile information for the document;

determining user profile information for the document using both the initial user profile information and the inferred user profile information;

associating, with the document, the user profile information for the document;

storing the association of the document with the user profile information for the document;

serving an advertisement with the document using the user profile information for the document stored in association with the document;

wherein obtaining the inferred user profile information for the document includes:

i) defining a separate node for each of a number of documents and for each of a number of users;

ii) adding edges between nodes; and iii) inferring a user profile information for the document using a topology of a graph of the nodes and the edges and using user profile information of users and of other documents;

determining that a document corresponding to a first node is linked with a document corresponding to a second node; and based on determining that the document is linked, adding an edge between the first node and the second node.

19. Apparatus for determining user profile information for a document, the apparatus comprising:

at least one processor;

an input device; and at least one storage device storing a computer executable code which, when executed by the at least one processor, causes the at least one processor to perform a method of:

determining initial user profile information for the document;

obtaining inferred user profile information for the document;

determining user profile information for the document using both the initial user profile information and the inferred user profile information;

associating, with the document, the user profile information for the document;

storing the association of the document with the user profile information for the document;

serving an advertisement with the document using the user profile information for the document stored in association with the document;

wherein obtaining the inferred user profile information for the document includes:
i) defining a separate node for each of a number of documents and for each of a number of users;
ii) adding edges between nodes; and
iii) inferring a user profile information for the document using a topology of a graph of the nodes and the edges and using user profile information of users and of other documents;

determining that a document corresponding to a first node was visited by a set of users that have visited another document corresponding to a second node; and based on determining that the document was visited, adding an edge between the first node and the second node.

20. Apparatus for determining user profile information for a document, the apparatus comprising:
at least one processor;
an input device; and
at least one storage device storing a computer executable code which, when executed by the at least one processor, causes the at least one processor to perform a method of:

determining initial user profile information for the document;

obtaining inferred user profile information for the document;

determining user profile information for the document using both the initial user profile information and the inferred user profile information;

associating with the document, the user profile information for the document;

storing the association of the document with the user profile information for the document;

serving an advertisement with the document using the user profile information for the document stored in association with the document;

wherein obtaining the inferred user profile information for the document includes:
i) defining a separate node for each of a number of documents and for each of a number of users;
ii) adding edges between nodes; and
iii) inferring a user profile information for the document using a topology of a graph of the nodes and the edges and using user profile information of users and of other documents;

determining that a user corresponding to a first node visited a set of one or more documents also visited by another user corresponding to a second node; and based on determining that the user visited the set of one or more documents, adding an edge between the first node and the second node.

* * * * *